United States Patent [19]
Anderson et al.

[11] 3,860,010
[45] Jan. 14, 1975

[54] CHAFF SAVER FOR COMBINES

[75] Inventors: Joseph A. Anderson; Chester G. Neukom, both of Jamestown, N. Dak.

[73] Assignee: Haybuster Manufacturing Inc., Jamestown, N. Dak.

[22] Filed: Sept. 13, 1973

[21] Appl. No.: 396,756

[52] U.S. Cl. .................. 130/24, 130/27 R, 56/14.6, 56/DIG. 2
[51] Int. Cl. ............................................. A01f 12/46
[58] Field of Search ....... 130/24, 26, 27 R; 56/14.6, 56/16.4, 153, 182, 192, DIG. 2; 171/6

[56] References Cited
UNITED STATES PATENTS

| | | | |
|---|---|---|---|
| 2,129,452 | 9/1938 | Van Sickle | 130/27 R |
| 2,249,394 | 7/1941 | Noffsinger | 171/6 |
| 2,670,845 | 3/1954 | Busack et al | 130/27 R |
| 3,731,468 | 5/1973 | Blumhardt | 56/192 |
| 3,757,797 | 9/1973 | Mathews | 130/24 |

*Primary Examiner*—Antonio F. Guida
*Attorney, Agent, or Firm*—Dugger, Johnson & Westman

[57] ABSTRACT

A chaff saver attachment for grain combines which collects the tailings normally ejected from the combine grain shoe and wasted by being dropped directly onto the ground. The chaff saver includes a packing member for packing the normal straw windrow into the stubble to form a base for the chaff and tailings, and conveyor means for depositing the tailings onto the top of the packed straw windrow where the tailings will be supported until the windrow is baled or otherwise collected by the farmer.

10 Claims, 4 Drawing Figures

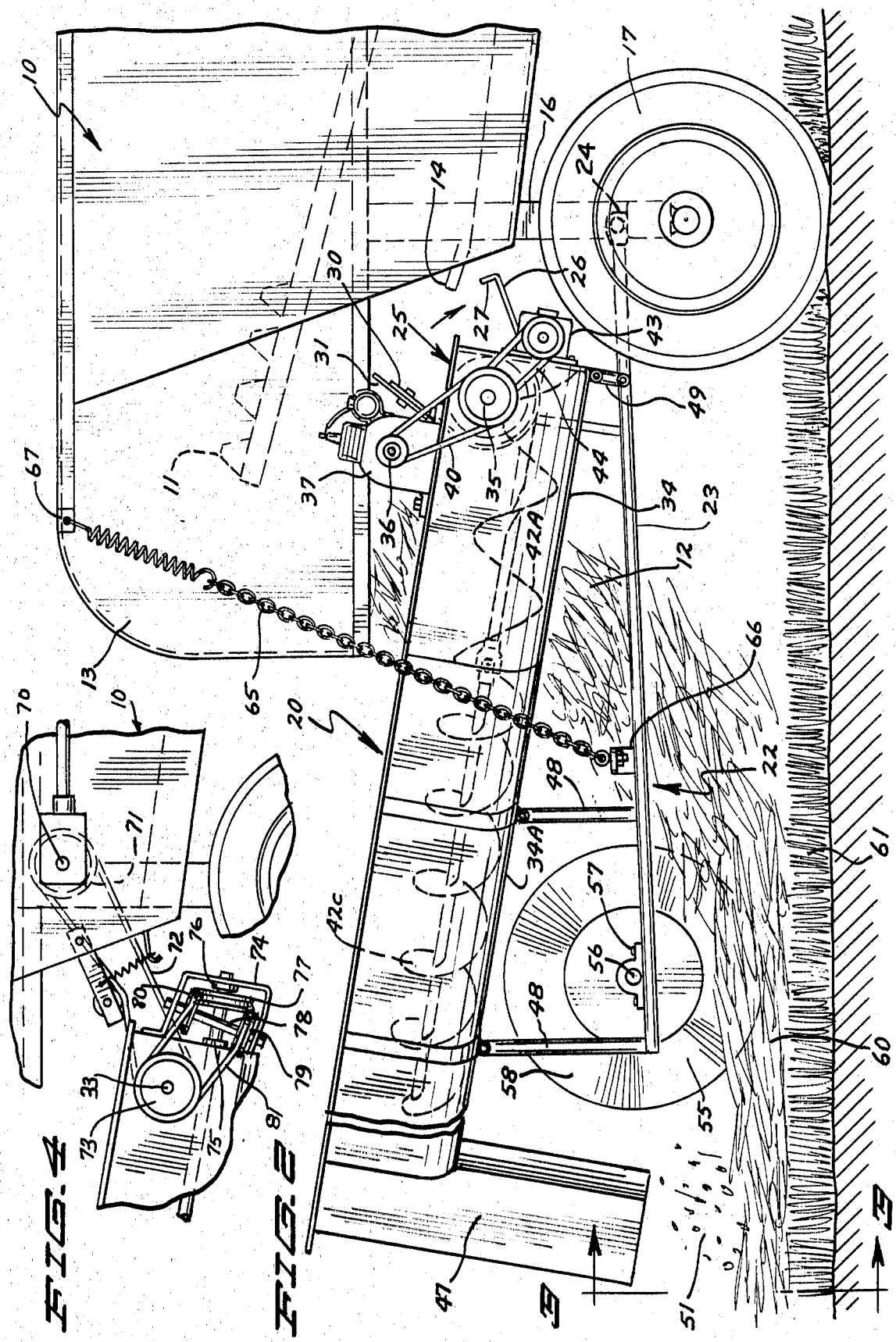

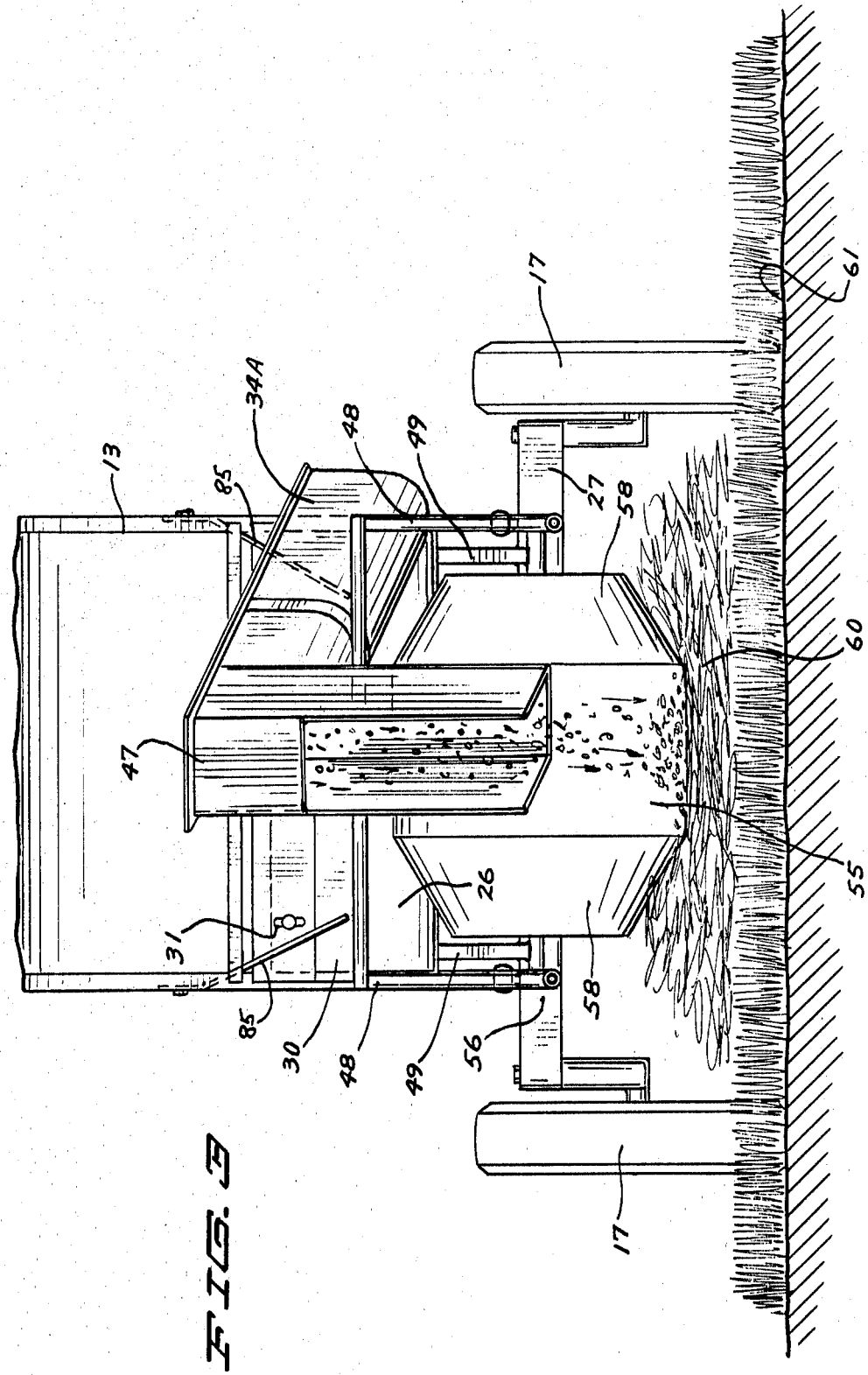

CHAFF SAVER FOR COMBINES

BACKGROUND OF THE INVENTION

1. Field of the Invention

The present invention relates to attachments for grain combines and more particularly for an attachment which aids in the saving of chaff, cracked grain, and other tailings from the grain shoe of the combine which are normally lost.

2. Prior Art

It has been recognized that most grain combine shoes will throw tailings which contain a significant amount of food value onto the ground. This material includes small kernels or seeds, broken kernels or seeds, chaff or hulls, and other particles which have nutritional value. For example, U.S. Pat. No. 3,669,123 relates to the idea of having an attachment for saving the "stover" which has nutritional value, but this device utilizes a chopper unit and a collector where the stover is mixed with chopped straw and then blown out through a tube and spout.

There are a number of patents which recycle the grain from the grain shoe of a combine back to the cylinder or straw walkers. For example, U.S. Pat. Nos. 2,875,768 and 3,202,154 show such devices.

U.S. Pat. No. 3,487,926 shows an arrangement for sifting and recovering residual seeds from the chaff. The chaff is collected in a unit and then the chaff undergoes a separating process.

There are other patents of this general type, but none which permit the collection of the tailings or screenings from a combine grain shoe and placing it onto the windrow of straw. The straw windrow and the screenings then can be baled with an ordinary haybaler and in this way forage having nutritional value is easily recovered.

SUMMARY OF THE INVENTION

A chaff saving attachment for collecting the chaff and screenings, generically called tailings, from the grain shoe of a combine and placing the tailings onto the top of a windrow of straw from the combine so that the tailings will not fall through the windrow onto the ground, but will be kept near the top of the windrow where they can be recovered as the straw windrow is baled.

The present device further includes means for packing the straw windrow to form a bed for the tailings prior to the time the tailings are deposited on this windrow, and in this manner insuring that even if there is rain or other adverse weather the tailings will not fall through the windrow easily.

The attachment can be placed onto any conventional combine, at the rear of the combine and includes a conveyor means for receiving the tailings from the grain shoe of the combine, and conveying the tailings laterally from the normal path of travel of the combine to another conveyor which in turn transports the tailings rearwardly and upwardly so that they can be deposited onto the top of the straw windrow that is coming through the combine. If desired, a separate power unit, such as a small gasoline engine, which is shown only schematically, can be used to drive the conveyors, or suitable belt drives from other components of the powered combine can be utilized for powering the conveyors which is the preferable way.

The packing member shown is an idler roller that does not require power but merely rolls along on top of the loose straw windrow to pack the straw windrow down onto the stubble left in the field and to provide a fairly firm bed for the tailings being carried by the conveyor from the grain shoe.

The attachment is easily installed, and relatively low in cost.

BRIEF DESCRIPTION OF THE DRAWINGS

FIG. 2 is a side elevational view of the device in FIG. 1;

FIG. 3 is a rear elevational view of the device of FIG. 1 with parts broken away for sake of clarity; and FIG. 4 is a fragmentary part schematic side view of a belt drive arrangement for the conveyors.

DESCRIPTION OF THE PREFERRED EMBODIMENT

Figure 1:
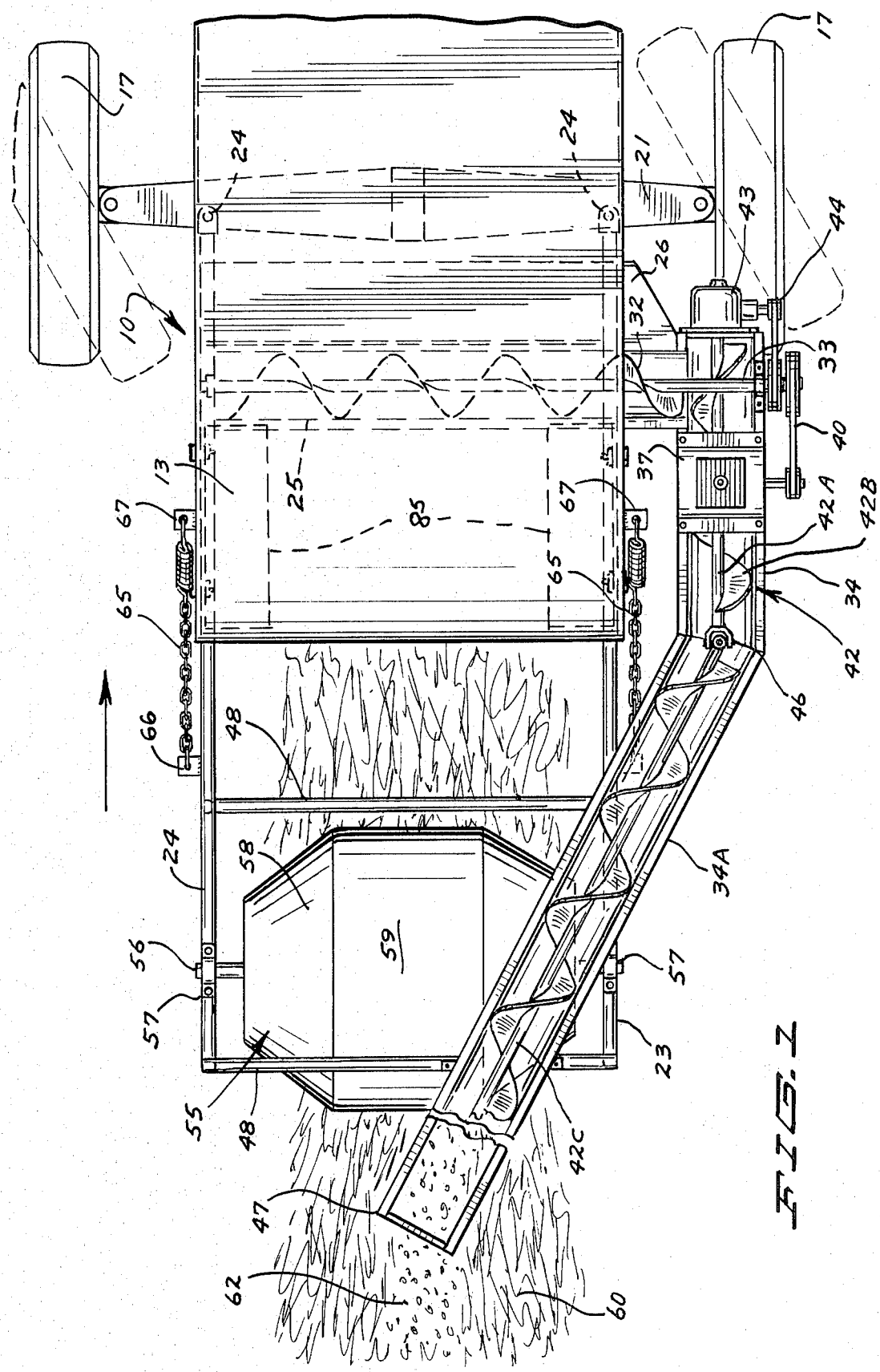
FIG. 1 is a top of the plan view of the rear portions of a typical combine showing the attachment installed thereon.

FIG. 1, the rear portions 10 of a combine are shown only schematically. The combine is a typical type, and as can be seen perhaps best in FIG. 2, includes a series of straw walkers 11 shown in dotted lines, which separate straw from the grain. The straw 12 is shown as it is discharged from below a hood 13. The grain in turn drops down onto a vibratory grain shoe 14 of known design operated in a known manner which separates whole grain being combined from hulls, chaff, damaged seeds, light seeds, and the like. Usually a fan is also provided for aiding the separation, and lighter material will be blown out through the rear opening of the combine as generally shown by the arrow 15 along with the material separated by the vibratory action.

The combine has a frame 16 that supports rear wheels 17 which are steering wheels that are controlled in a normal manner from the operator's platform, which is not shown. Also, the power source for the combine is not shown, but the combine is powered by an engine in the usual manner well known in the art.

The chaff saver attachment is shown generally at 20 and is mounted onto the axle 21 supporting the rear wheels 17 from the frame 16. The attachment 20 as shown has a main framework 22 which includes a pair of side frame members 23 that extend for and aft and have ball joint socket members 24 at the forward ends thereof. The ball joint socket members 24 mount onto ball supports that are attached to the axle 21, in known manner. Similar ball joints are used quite widely in many applications, and are therefore not shown in detail, but the connections will permit the frame to pivot up and down, and move also with the axle a limited amount if the axle tilts. Cross members are also provided for the frame extending between the side members 23, and these cross members are selected in size and position to adequately support the rest of the components.

In addition, the chaff saver attachment includes a first cross conveyor illustrated generally at 25 which is an auger type conveyor having an auger housing 26 extending transversely across the machine. The auger housing 26 has a forwardly extending lip 27 that is positioned underneath the grain shoe 14, at the rear thereof and in position to collect tailings dropping over the rear portion of the grain shoe at the back of the combine as the shoe vibrates. The housing 26 further includes an upwardly extending portion 30 at the rear thereof that has an adjustable deflector shield 31 thereon which can be moved to come closer to the rear portions of the hood 13 of the combine, if desired, or adjusted in a desired manner. A screw conveyor auger 32, which is of usual design, is mounted on suitable bearings in the housing 26. The auger 32 has a central shaft 33 that extends laterally across a second auger trough 34 that is positioned alongside the combine and mounted on the frame 22. The central shaft 33 is mounted on a suitable bearing on the outer side of the trough 34, and a suitable pulley 35 can be mounted on this central shaft.

The pulley 35 in turn is driven from a pulley 36 on the output shaft of a suitable power source 37 which could be a small single cylinder engine of suitable horsepower. The pulley 35 can be driven from some other component on the combine through a suitable belt or gear arrangement. Likewise, the output of power source 37 could include a suitable gear reduction unit if necessary. A V-belt 40 extends between the pulleys 35 and 36 to drive the cross auger shaft 33 and thus rotate the auger to convey material falling into the trough 26 laterally to one side of the unit and into the trough 34. It should be noted that one side portion of the trough 34 is recessed to permit material coming along the end of the trough 26 to drop into the trough 34. The trough 34 extends in direction rearwardly along the side of the combine, and a section 34A of this trough then is placed at an angle with respect to the main part of the trough. The Section 34A extends laterally inwardly toward the central axis of the combine. This is perhaps best shown in FIGS. 1 and 2.

A helical auger conveyor 42 is mounted in the trough 34, and includes a first section 42A that is driven from a gearbox 43 which in turn is mounted on the end of the trough 34. The gearbox 43 is driven through a belt and pulley arrangement 44 from the shaft 33 of the cross conveyor. The auger section 42A has a shaft that is driven directly from the gearbox 43, and includes a helical auger flighting section 42B. A universal joint 46 is used to connect the auger section 42A with a second auger section 42C that is mounted in the trough 34A and runs at an angle to auger section 42A. The outer end of the auger section 42C can be also mounted in suitable bearings, and as shown, the auger terminates short of an open chute 47 at the end of the trough section 34A.

It should be noted that one shaft from the right angle gearbox 43 could extend inwardly toward the combine, and a suitable drive pulley could be attached to that shaft on the opposite side from the belt and pulley arrangement 44, to be powered from components on the combine. Thus a drive through the gearbox 43 to power both augers can be made without using the auxiliary power source 37 illustrated, or as will be explained in connection with FIG. 4, a V-belt may be used to drive all components.

The side members 23, 23 as shown have the cross members 48 for supporting the auger trough 34A, and also have support members 49 for supporting the trough 26 in a suitable manner. Bracing can be added as desired.

The side members 23, 23 of the frame 22 also are used for supporting a packing roller illustrated generally at 55. As shown, the packing roller 55 is of size to fit between the side members 23, 23, and has a central shaft 56 which is relatively mounted on suitable bearings 57 that are attached to the side members 23, 23. The packing roller 55 can be of any design or construction, but as shown has tapered end portions 58 that expand toward a center section 59 that is of smooth cylindrical configuration and which will ride on top of the straw windrow illustrated generally at 60 which is dropped from the hood 13 of the combine. Packing member 55 can be provided with sufficient weight so that it will pack the windrow 60 down into the stubble 61. The roller is free-wheeling, and merely rolls along the top of the windrow 60 without being powered, but does provide the packing necessary. The packing roller 55 may be made of an open network construction such as a pipe framework with the cylindrical center section 59 mounted onto the pipes to provide the smooth packing surface for packing the windrow and leaving a slight depression therein as illustrated generally at 62 in the center of the windrow 60.

In FIG. 2, note that the break line in the rearwardly extending auger section makes the chute 47 appear relatively close to the roller. In actual practice, however, the tailings are deposited by the chute 47 about two feet behind the roller 55. The important feature is that the straw must be substantially at rest when the tailings are deposited on the windrow. After the compression of the windrow by the roller the straw in the windrow and also the stubble tend to spring back. The screenings are deposited far enough back so this spring back is substantially completed before the tailings are deposited on the windrow. If the windrow is still moving the tailings are likely to drop through the windrow onto the ground.

In order to support the frame 22, and the roller, at the desired height, suitable support chains 65 may be utilized and attached to brackets 66 on the side frame members 23, in a usual manner, and the other end can be attached to suitable support bracket 67 at the upper edges of the combine. These are shown schematically, and if chains are used, the height of the frame 22 can be adjusted by hooking the attaching links into different chain links for changing the length of the support chain 65. Springs also can be used to partially support the frame if desired. A winch could be used on the operator's platform and chains or cables supporting the framework 22 could run over suitable pulleys to the winch so that the operator could raise and lower the chaff saver unit from the platform. Also, if desired, a powered raising and lowering mechanism could be utilized such as a hydraulic cylinder, or a small electric winch operated from the combine power supply. Referring specifically to FIG. 4 a preferred drive is shown. While the drive per se does not form a part of the invention, the assembly of FIG. 4 provides a low cost measure of driving the augers. Most combines are provided with a rotary shaft 70 power driven to drive the straw walkers 11. A V belt pulley shown in dotted line 71, on the far side of the combine, is attached to the powered shaft 70. A V belt 72 is then used to drive a pulley on the far end of auger shaft 33 to power the auger. At the near end of shaft 33 a V pulley 73 is drivably mounted.

As also can be seen, a frame 74 is attached to the end of auger housing of trough 34 in place of gearbox 43. The shaft of auger section 42A is mounted in spaced bearings 75 and 76 and a drive pulley 77 is mounted between the bearings. The frame 74 extends laterally and a shaft 78 is mounted to the frame. A pair of guide pulleys 79 and 80 are rotatably mounted on the shaft and are positioned to guide a V belt 81 from pulley 73 around the end of trough 34 to drive pulley 77, and in this manner drive auger section 42A. The guiding of V belts around right angles as shown is commonly done in low cost, low power drives.

A suitable spring-loaded belt tightening is used on belt 72 to take up slack to permit the FIG. 22 to pivot relative to the combine.

In operation, the combine is run in the normal manner except that the attachment is in place at the rear of the combine and tailings falling off the grain shoe will drop into the trough 26, and be conveyed by the conveyor flights 32 into the trough 34 where the conveyor 42 will move the material rearwardly and then toward the center line of the machine to drop the tailings into the depression 62 formed in the windrow by the packing roller 55. The straw will be packed sufficiently to form a bed for the tailings. The tailings are dropped far enough to the rear of the roller so the straw windrow is substantially at rest and the tailings will not easily fall through the straw windrow. The tailings, including grain pieces, and small kernels will be supported off the ground on the windrow so that later a haybaler can easily pick up the windrow 60 including the tailings and bale it for use as cattle feed. The straw and the tailings can also be run through a suitable mill to chop it all up into an edible roughage for cattle, or can be processed in any desired manner.

As shown in FIG. 1 and 3, flat panels 85, 85 can be bolted to the sides of the hood 12 to deflect the straw into a more narrow and deeper windrow to aid in providing adequate support for the tailings. The lower edges of these panels may be bent inwardly toward each other as desired and also may be spring loaded by extending a light tension spring between the lower ends of the two plates so they were spring loaded toward each other.

The chaff saver unit is easily attached to any existing combine by modifying the frame 22 as necessary and making suitable attaching brackets to go onto the framework of the combine. The combine can be operated with a straw chopper at the back if desired. Straw choppers are commonly used in many parts of the country for chopping up the straw as it comes out through the hood 13. If choppers are used, deflectors may be adapted to deflect the chopped straw into a windrow that the roller 55 can pack down for forming a bed or support for the screening being delivered by the cross conveyor and the delivery conveyor.

The ballsocket member 24 may be trailer hitch couplers, and the ball member may be hitch balls mounted to the combine, if desired.

What is claimed is:

1. In a chaff saver attachment for a grain combine having an opening through which straw is discharged onto the ground, and a grain shoe for separating chaff and tailings from the grain being combined, said grain shoe being positioned to discharge the tailings to the rear of the combine, the improvement comprising conveyor means for collecting and conveying said tailings to a discharge opening positioned at a preselected position to the rear of said combine, and above the straw discharged by said combine.

2. The combination specified in claim 1 wherein said conveyor means comprises first and second conveyor sections, a first conveyor section positioned to collect and convey said tailings in direction transverse to a normal direction of movement of said combine, and a second conveyor section to convey said tailings rearwardly and upwardly and toward the center of the straw discharged by said combine.

3. The combination specified in claim 1, and packing means positioned to the rear of said combine and supported on said combine, said packing means engaging the top portion of the straw discharged by said combine ahead of said discharge opening in the direction of normal travel of said combine, to pack said straw prior to discharge of said tailings thereon.

4. The combination specified in claim 3 and a frame member pivotally mounted on said combine for supporting said packing means, and means to adjust the pivotal position of said packing means with respect to said combine.

5. The combination specified in claim 4 wherein said packing means comprises a roller rotatably mounted on said frame about an axis extending substantially transverse to the normal direction of movement of said combine.

6. The method of saving tailings from a combine grain shoe for later baling of said tailings together with straw left by a combine, comprising the steps of packing a windrow of straw left by said combine, collecting said tailings after the tailings have left said grain shoe and prior to the time the tailings reach the ground, and conveying said tailings onto the top of said windrow of straw subsequent to the performance of said packing step on said windrow.

7. The method of claim 6 comprising the steps of first conveying said tailings laterally to one side of said combine, and then conveying said tailings rearwardly and forming the tailings into a layer deposited on top of said windrow a sufficient time after said packing step so that windrow is substantially at rest when the tailings are deposited thereon.

8. An attachment for a grain combine having a straw discharge forming a windrow of straw and a grain shoe, said attachment comprising means for saving the tailings normally ejected from the combine, said attachment including a frame member mounted on said combine, a packing roller rotatably mounted on said frame member to the rear of said combine and positioned to ride over the top of said windrow of straw as said combine moves in a normal direction of operation, conveyor means mounted on said frame and positioned to receive tailings from said grain shoe of said combine, said conveyor means including a first conveyor section to receive tailings from said grain shoe and to move said tailings laterally of said combine to position adjacent one side thereof, and a second conveyor section positioned to move tailings received from said first section rearwardly and upwardly, to a position behind said packing roller with respect to the normal direction of travel of said combine whereby said tailings are deposited on top of said windrow of straw subsequent to passage of said packing roller over said windrow of straw.

9. The combination specified in claim 8 and means to pivotally mount said frame member on said combine, and means to adjust the pivotal position of said frame member with respect to said combine.

10. The conbination of claim 8 wherein said second conveyor section has a chute member at the rear end thereof to receive said tailings and form said tailings into a stream of tailings, said chute member being positioned sufficiently to the rear of said packing roller so that said windrow of straw is substantially at rest directly below said chute.

* * * * *